(12) United States Patent
Weiler

(10) Patent No.: US 7,051,633 B2
(45) Date of Patent: May 30, 2006

(54) AMPOULE CARD SPLITTER

(75) Inventor: Gerhard H. Weiler, Woodstock, IL (US)

(73) Assignee: Weiler Engineering, Inc., Elgin, IL (US)

( * ) Notice: Subject to any disclaimer, the term of this patent is extended or adjusted under 35 U.S.C. 154(b) by 130 days.

(21) Appl. No.: 10/347,202

(22) Filed: Jan. 17, 2003

(65) Prior Publication Data

US 2004/0139834 A1 Jul. 22, 2004

(51) Int. Cl.
*B26D 1/03* (2006.01)
(52) U.S. Cl. .................. 83/425.3; 83/437.2; 83/858
(58) Field of Classification Search ............. 83/425.3, 83/435.15–435.19, 27, 278, 431, 435, 437.2, 83/171, 437.3, 856, 437.4, 858, 437.5, 903, 83/437.6, 914, 437.7, FOR. 100, FOR. 102, 83/870, 874, 424, 425.2, 434, 440, 435.11, 83/443, 444, 451, 857, 945, 947, 873
See application file for complete search history.

(56) References Cited

U.S. PATENT DOCUMENTS

| | | | | |
|---|---|---|---|---|
| 22,330 A | * | 12/1858 | Manning | 425/299 |
| 1,508,778 A | * | 9/1924 | Doering | 83/165 |
| 1,710,327 A | * | 4/1929 | Walters | 83/876 |
| 1,907,602 A | * | 5/1933 | Spang | 452/148 |
| 2,103,537 A | * | 12/1937 | Killman et al. | 83/123 |
| 2,283,030 A | * | 5/1942 | Bakewell | 83/679 |
| 2,497,289 A | * | 2/1950 | Bloomfield | 83/435.19 |
| 2,699,806 A | * | 1/1955 | Gardner | 99/537 |
| 3,112,780 A | * | 12/1963 | Lecrone | 83/873 |
| 3,448,648 A | * | 6/1969 | Sixt et al. | 83/566 |
| 3,538,802 A | * | 11/1970 | Helm et al. | 83/411.6 |
| 4,576,074 A | * | 3/1986 | Van der Togt | 83/358 |
| 5,503,885 A | * | 4/1996 | Anderson | 428/35.7 |

FOREIGN PATENT DOCUMENTS

GB         645045    * 10/1950

* cited by examiner

*Primary Examiner*—Kenneth E. Peterson
(74) *Attorney, Agent, or Firm*—Olson & Hierl, Ltd.

(57) ABSTRACT

A device for splitting apart a card of thermoplastic ampoules is described. The splitter device includes a card receiving base, a cutter assembly, and a pusher assembly for pushing the card along the base through the cutter assembly so as to divide the card into separate thermoplastic ampoules or groups of ampoules.

7 Claims, 5 Drawing Sheets

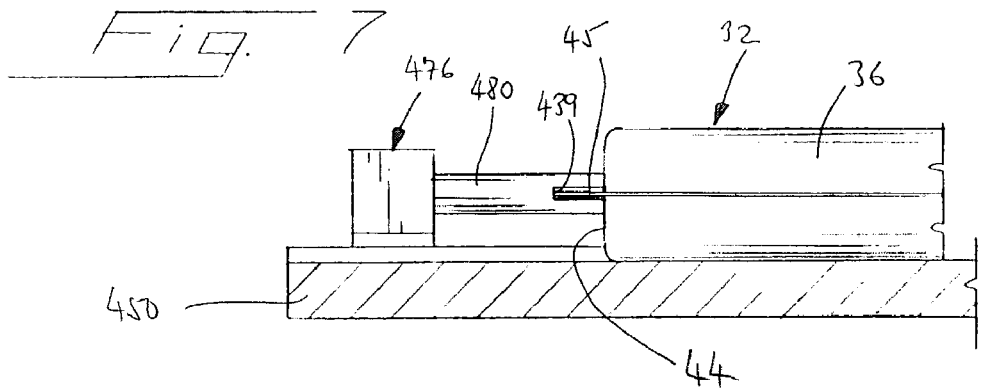
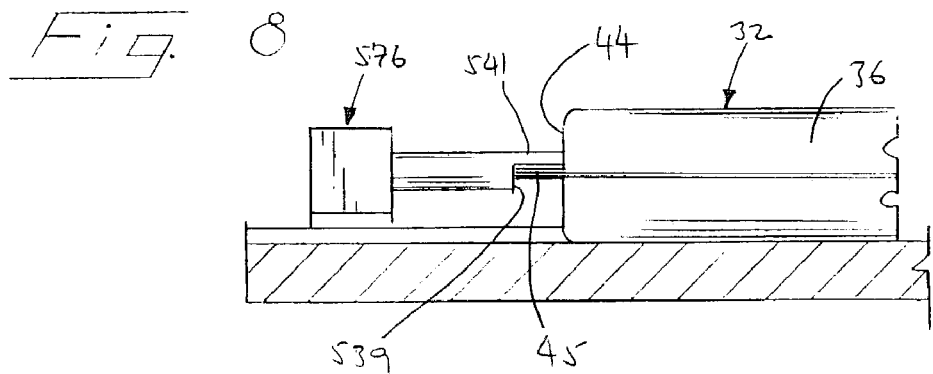
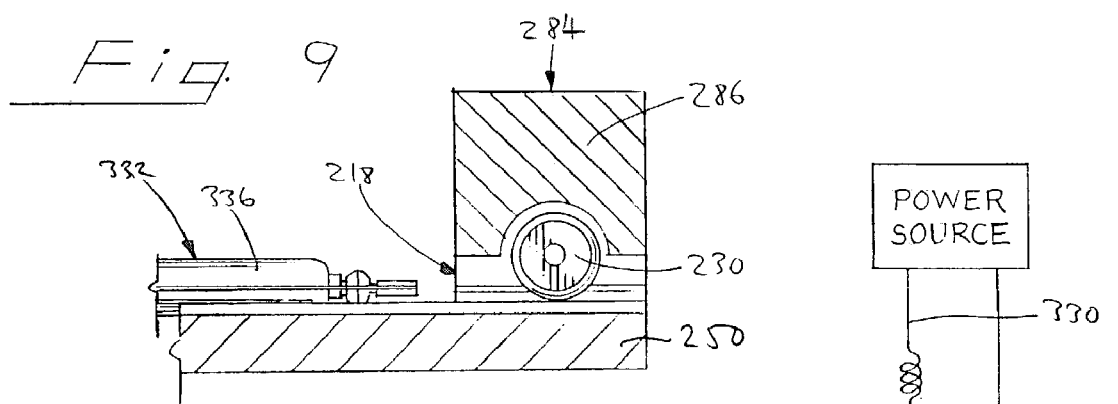
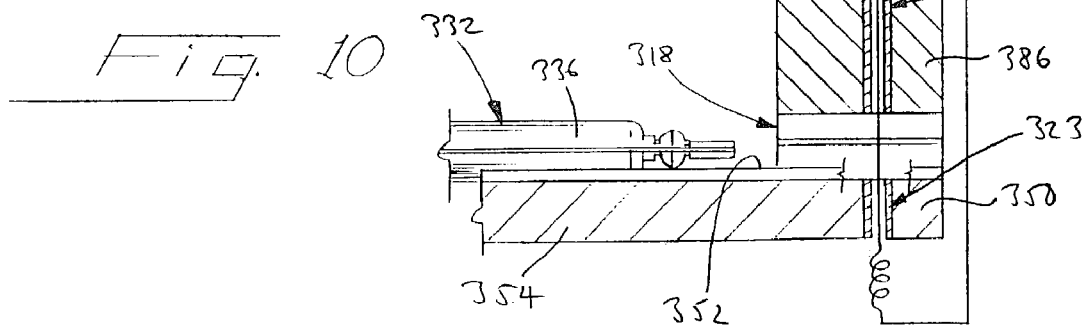

AMPOULE CARD SPLITTER

FIELD OF THE INVENTION

The invention relates to ampoule cards and, more particularly, to an assembly for splitting and separating the ampoules on a card.

BACKGROUND OF THE INVENTION

A well-known and effective method of making pharmaceutical products and other sterile thermoplastic products employs form, fill and seal machinery such as the machinery disclosed in U.S. Pat. No. 3,597,793 to Weiler, U.S. Pat. No. 4,176,153 to Weiler et al., U.S. Pat. No. 4,178,976 to Weiler et al., U.S. Pat. No. 4,707,966 to Weiler et al., and the patents cited therein. The machinery can be adapted to form cards containing several thermoplastic containers or ampoules which are joined together by frangible webs extending along adjoining sides of the respective containers. One such card is disclosed in, for example, U.S. Pat. No. 5,503,885 to Anderson. The end user subsequently splits off individual ampoules from the card prior to use.

Although the shipment of ampoules in card form has proven satisfactory for a majority of the intended applications, a need has been identified which requires the ampoules to be made available individually rather than as a card such as, for example, where an protective inert gas envelope is desired for the ampoules, and the manual splitting of the ampoules would adversely affect such inert gas envelope for a card of ampoules.

The present invention is directed to an assembly which allows a card of ampoules to be split into individual ampoules or a lesser group of ampoules during the manufacturing operation rather than manually at the point of use.

SUMMARY OF THE INVENTION

An apparatus or device for splitting a card containing a plurality of thermoplastic containers or ampoules includes a base adapted to receive the card, a cutter assembly at one end of the base, and a pusher assembly at the other end of the base which pushes the card past the cutter assembly and splits the card into the individual containers or ampoules.

In one embodiment, the base includes a plurality of spaced-apart elongate grooves which are adapted to receive a plurality of containers constituting the card, and the cutter assembly includes a block extending over the base and defining a passageway between the block and the base sized to receive the card. The cutter assembly is provided with a plurality of cutters mounted to and extending downwardly from the block into the passageway in a spaced-apart relationship to one another. The card is adapted to be pushed through the passageway by the pusher assembly and separated into individual containers or ampoules by the cutters. The cutters are spaced from the entrance opening of the passageway so that the card can be appropriately oriented before contacting the cutters.

The cutters may comprise, for example, straight blades, circular blades mounted for rotation in the block, or hot wires extending through the passageway defined between the block and the base.

The pusher assembly of the present invention includes an elongate bar slidably mounted to the base. The bar extends across the base and carries a plurality of elongate, spaced-apart rods that are mounted to and extend generally normally away from the bar and generally parallel to the base. Each of the rods includes a free distal end adapted to abut the bottom of the respective containers in a card for pushing the card past the cutter assembly.

In one embodiment, to accommodate a card in which the bottom of each of the containers includes an outwardly protruding tab, the free end of each of the rods includes a groove adapted to receive the tab. In another embodiment, the free distal end of each of the rods includes a shoulder adapted to rest against the top of the tab.

Other features and advantages of the present invention will become readily apparent from the following detailed description, the appended drawings, and the accompanying claims.

BRIEF DESCRIPTION OF THE DRAWINGS

In the accompanying drawings forming part of the specification and in which like numerals are employed to designate like parts throughout the same.

FIG. 7 is a fragmentary elevational view, partly in section, of a second embodiment of the pusher rod assembly of the ampoule splitter of the present invention;

FIG. 8 is a fragmentary elevational view, partly in section, of another embodiment of the pusher rod assembly of the ampoule splitter of the present invention;

FIG. 9 is a fragmentary elevational view of a further embodiment of the cutter assembly of the ampoule splitter of the present invention; and FIG. 10 is a fragmentary elevational view of yet another embodiment of the cutter assembly of the ampoule splitter of the present invention.

DESCRIPTION OF THE PREFERRED EMBODIMENTS OF THE INVENTION

While this invention is susceptible of embodiment in many different forms, this specification and the accompanying drawings disclose only certain specific examples that illustrate the ampoule card splitter of the present invention. The invention is not intended to be limited to the embodiments so described, however, and the scope of the invention is delineated in the appended claims.

For ease of description, the ampoule card splitter assembly of this invention is described in its normal (horizontal) operating position, and terms such as upper, lower, horizontal, etc., are used with reference to this horizontal position. It will be understood, however, that in some applications other positions of the splitter assembly may be accommodated.

Additionally, some of the figures illustrating the ampoule splitter of the invention and the ampoule card adapted to be split by the splitter show structural details and mechanical elements that will be readily recognized by one skilled in the art. The detailed descriptions of such elements are not necessary to an understanding of the invention, and accordingly, are not herein presented. Moreover, the device of this invention is used with certain conventional components the details of which, although not fully illustrated or described, will be apparent to those having skill in the art and an understanding of the necessary functions of such components.

Figure 1:
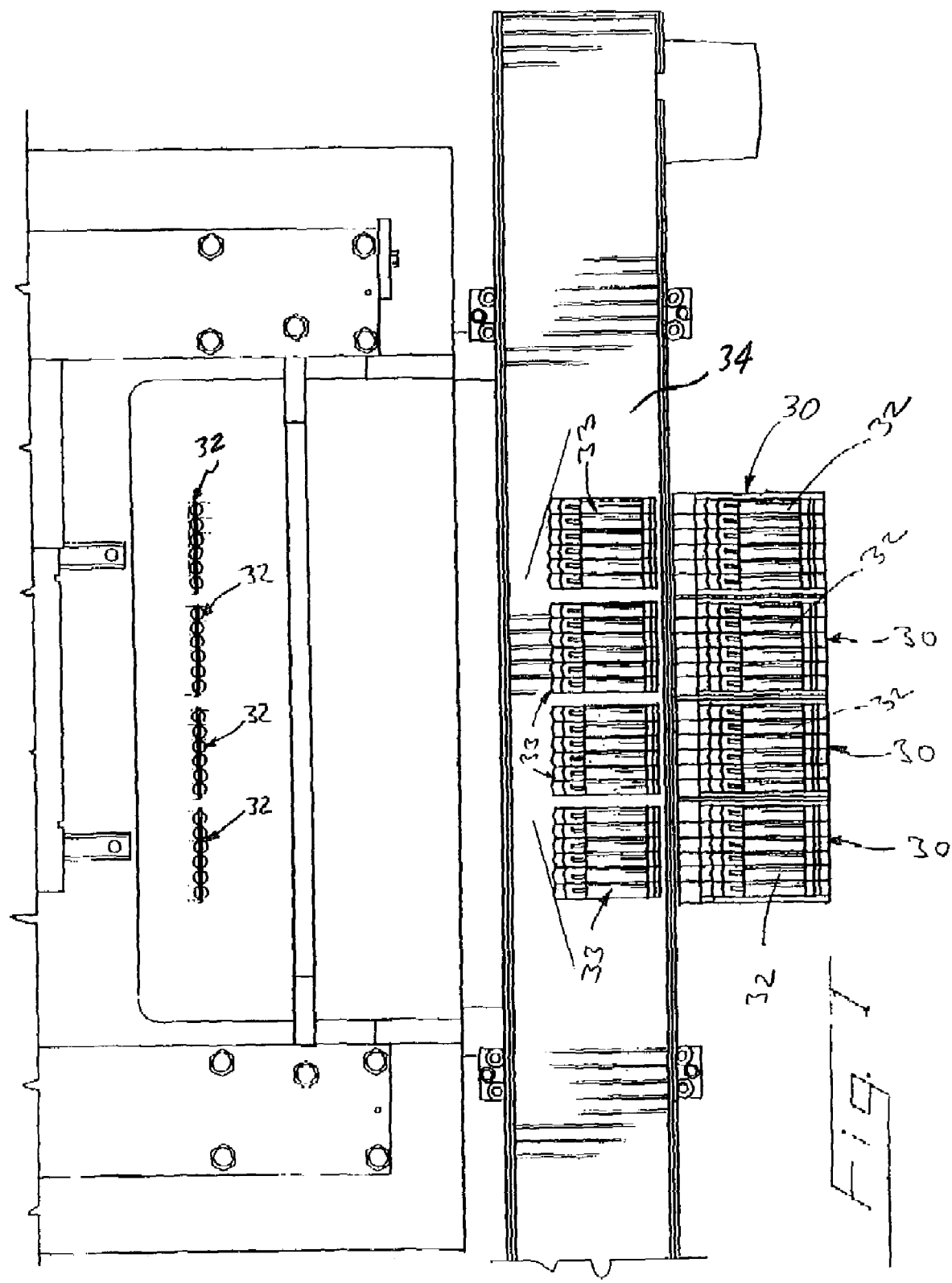
FIG. 1 is a simplified, schematic top plan view of the environment in which the ampoule splitter of the present invention is utilized during the manufacturing and packaging operation.

FIG. 1 depicts the environment in which the ampoule splitter 30 of the present invention is utilized during the manufacturing and packaging operation. Specifically, the splitter 30 is used following the formation of ampoule or container cards 32 of the type shown in an upright position in FIG. 1, and disclosed in U.S. Pat. No. 5,503,885 identified above, using the form-fill-seal method of the type disclosed in U.S. Pat. No. 3,597,793 to Weiler and the other representative patents identified above.

After the cards 32 have been made, the cards are separated from surrounding mold flash in conventional manner prior to being introduced into the splitter 30 of the present invention by a robot arm or a similar parts handling mechanism. FIG. 1 in particular depicts the transfer of four separate sets of ampoule cards 32 into four respective separate splitters 30 and the subsequent placement of four groupings 33 of separated ampoules from cards 32 on a conveyor 34 following the splitting operation for packaging.

Figure 2:
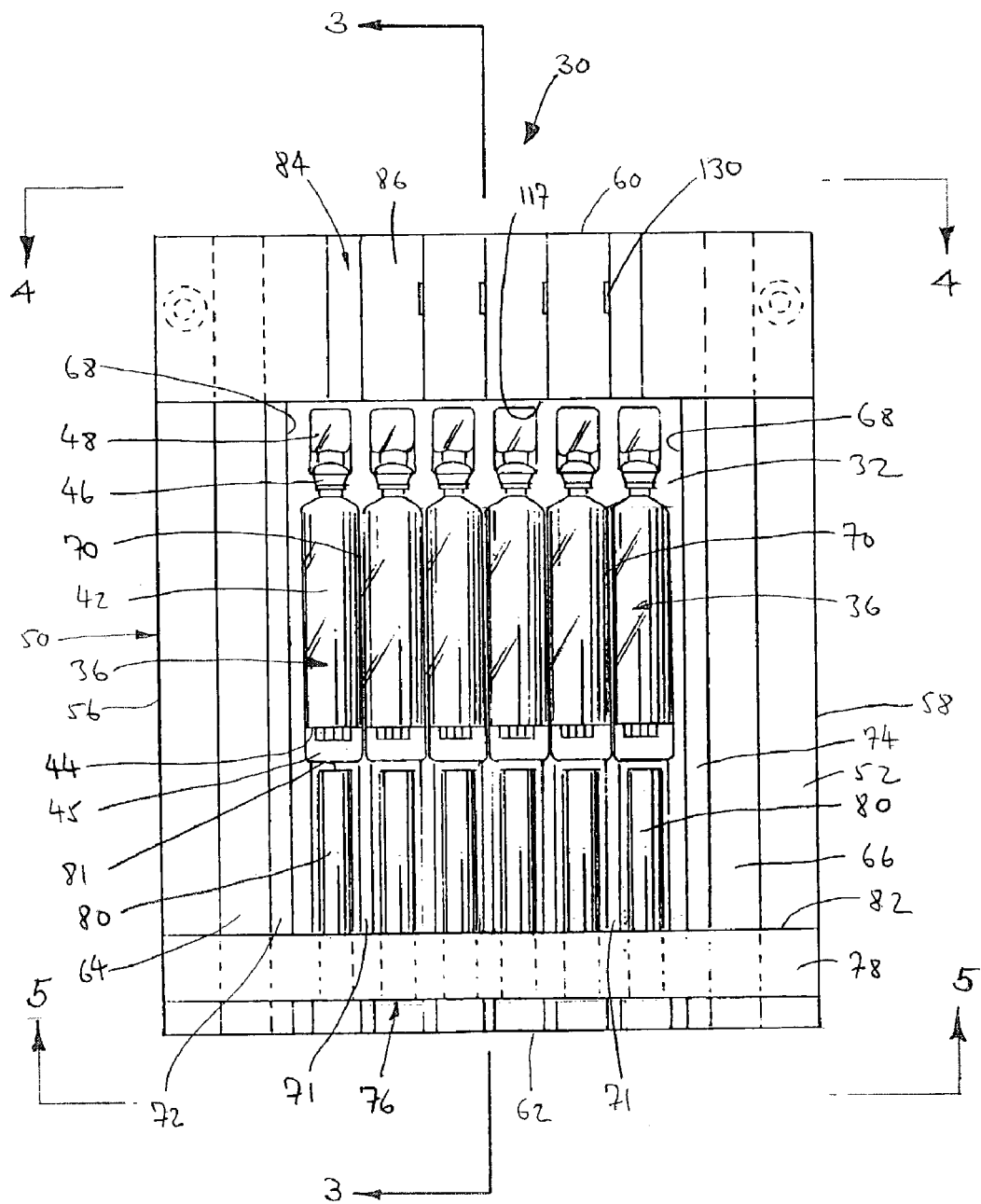
FIG. 2 is a top plan view of the ampoule splitter of the present invention depicting a card of ampoules seated therein prior to engagement with the cutter assembly.

FIG. 2 shows one of the ampoule cards 32 nested in base plate 50 of one of the splitters 30. The card 32 as shown may be made from a variety of thermoplastic materials, including high density polyethylene as well as polypropylene, and includes a total of six elongate sealed ampoules or containers 36 joined together in a side-to-side and parallel relationship along respective elongate frangible webs 70 therebetween formed between the respective adjoining longitudinal sides of the respective containers 36 during the molding process. Although the cards shown in FIGS. 1 and 2 include six containers 36 each, depending upon the particular application, the card 32 may include either less or more such containers as desired.

Figure 3:
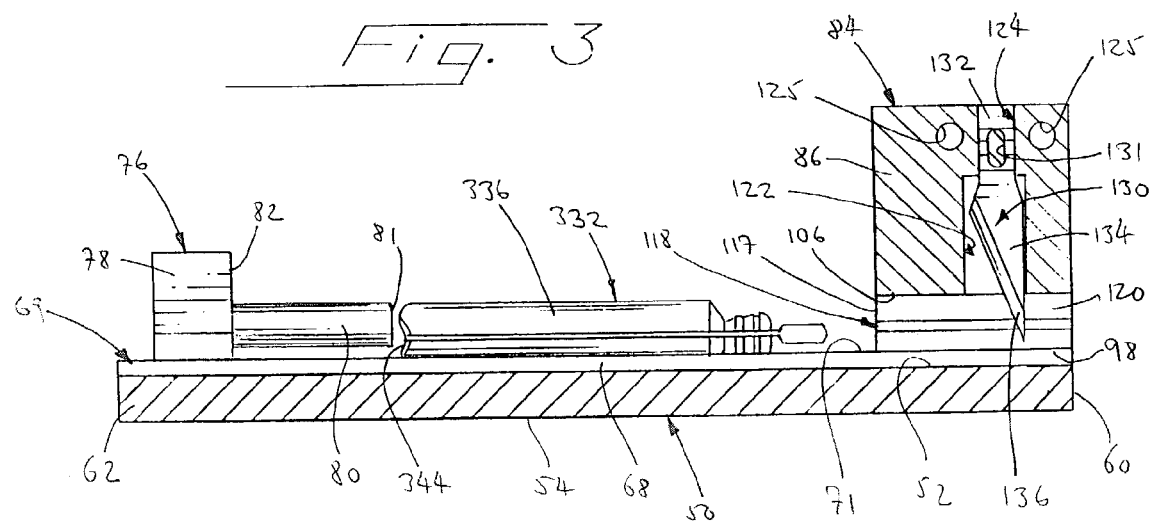
FIG. 3 is a cross-sectional side view of the ampoule splitter taken along the plane 3—3 in FIG. 2.

As shown in FIG. 2, each of the containers 36 includes an elongate cylindrically shaped fluid containing body 42 terminating at a lower end thereof in a bottom 44 including an outwardly protruding horizontal tab 45. A nozzle 46 at the other end of the body 42 is occluded by a cap 48 which is adapted to be twisted off the nozzle 46 for dispensing the contents in the body 42. FIG. 3 discloses an alternate card embodiment 332 and container embodiment 336 which does not have the tab 45 of the container 36 disclosed in FIG. 2 but instead has a generally flat bottom 344.

As shown in FIGS. 2–5, the splitter 30 comprises a generally rectangularly shaped base plate 50 with respective upper and lower faces 52 and 54 (FIG. 3), longitudinal peripheral side edges 56 and 58, and top and peripheral edges 60 and 62 respectively. A pair of longitudinally extending rectangularly-shaped guide slots 64 and 66 in the upper face 52 extend longitudinally between the transverse edges 60 and 62. The slot 64 is positioned adjacent and parallel to the longitudinal side edge 56 while the slot 66 is positioned adjacent and parallel to the opposite longitudinal side edge 58.

The base plate 50 also includes a grooved recess 69 having a plurality of semi-circularly shaped grooves 68 in upper face 52 thereof. The grooves 68 extend within the recess 69 in a parallel relationship between the respective slots 64 and 66 thereof and in a longitudinal direction between peripheral edges 60 and 62 respectively. Adjoining grooves 68 are separated and spaced from each other by respective spaced, elongate, flat lands 71. The semi-circular grooves 68 are adapted to accommodate cylindrically shaped containers; however, grooves of other shapes to accommodate containers of different configurations can be utilized as well.

A pair of elongate, longitudinally extending keys 72 and 74 (FIG. 5) are defined in, and protrude outwardly from, the upper face 52 of the plate 50. The key 72 extends in the longitudinal direction along grooves 68 adjacent to slot 64 while the key 74 extends in the longitudinal direction along grooves adjacent to slot 66.

The card 32 is seated on the plate 50 in a nesting relationship therewith so that the individual containers 36 are oriented in a longitudinal direction on the plate 50 between cutter assembly 84 and pusher assembly 76, and are seated within the respective grooves 68 formed in the recess 69 defined in the face 52 of the plate 50. In this relationship, the respective adjoining sides 70 of the containers 36 are positioned above and generally longitudinally vertically in a co-planar alignment with the respective lands 71 in the plate 50.

Figure 4:
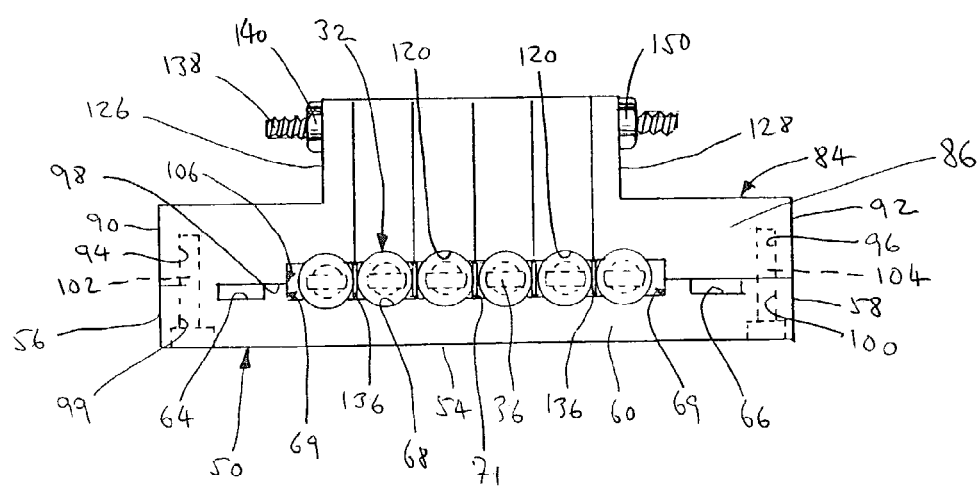
FIG. 4 is an end elevational view of the ampoule splitter taken along the plane 4—4 in FIG. 2.
Figure 5:
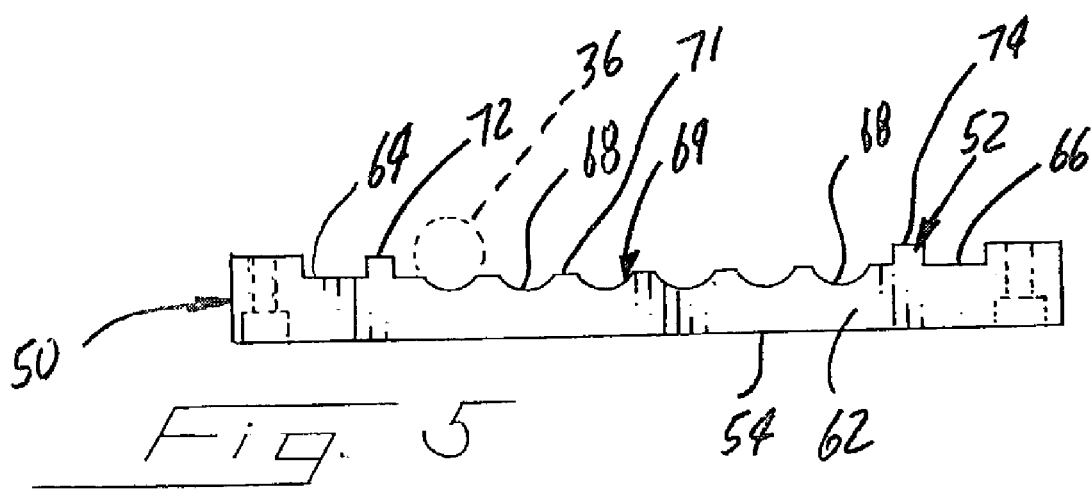
FIG. 5 is an opposite end elevational view of the base of the ampoule splitter taken along the plane 5—5 in FIG. 2.
Figure 6:
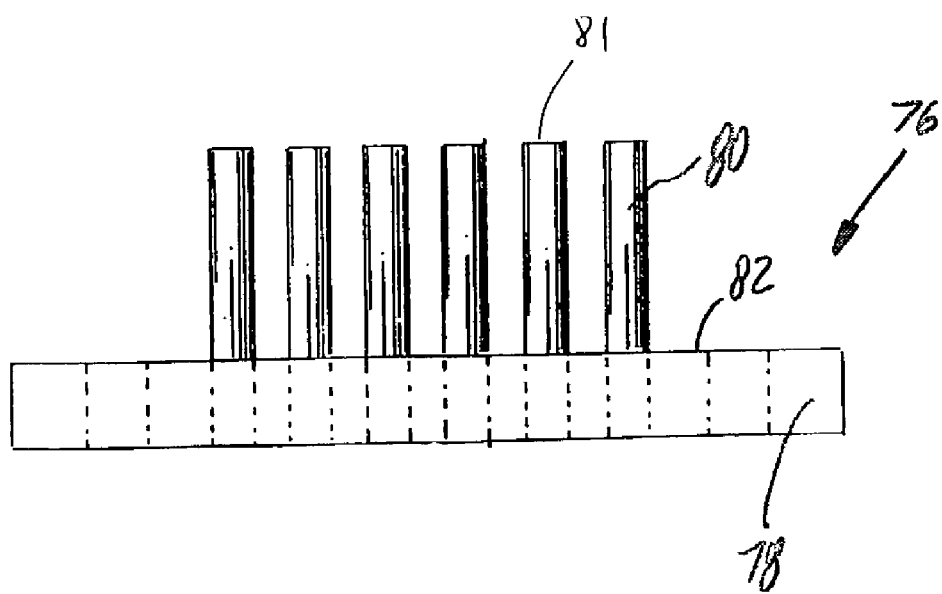
FIG. 6 is a top plan view of the pusher rod assembly of the ampoule splitter of the present invention.

Still referring to FIGS. 2–4 and additionally FIG. 6, the splitter 30 further comprises a card pusher assembly 76 including an elongate pusher bar 78 located adjacent to and parallel to the transverse edge 62 of the plate 50 and extending across the top of the plate 50 between the peripheral side edges 56 and 58 thereof. The pusher bar 78 is adapted to be seated over the plate 50 for sliding longitudinal movement thereon in the direction of the card 32. Although not shown in any of the drawings, the underside of the bar 78 includes complementary slots and keys adapted to fit within the slots 64 and 66, and the keys 72 and 74, in the face 52 of the base 50, when the bar 78 is seated over the base 50.

The pusher assembly 76 is provided with a plurality of elongate rods 80 having the proximal ends thereof mounted to bar 78. Rods 80 protrude generally horizontally outwardly from the front vertical face 82 of the bar 78 and in a spaced-apart and parallel relationship to one another across the front face 82. The respective rods 80 are spaced from the respective grooves 68 in the plate 50 when the pusher bar assembly 76 is seated over the plate 50 and are aligned generally vertically and co-planar with the respective grooves 68 for the purposes described in more detail below. Free distal ends 81 of rods 80 are adapted for engagement with the containers in an ampoule card.

A card cutter assembly 84 for splitter 30 includes a cutter block 86 located adjacent to and parallel with transverse edge 60 of the plate 50. The cutter assembly 84 extends across the top of the plate 50 between the peripheral side edges 56 and 58 thereof.

As can be seen in FIGS. 3 and 4, the cutter block 86 is removably secured to the top face 52 of the plate 50. Cutter block 86 includes opposed side faces 90 and 92 (FIG. 4) which are aligned with the peripheral side edges 56 and 58 of the plate 50 respectively. Vertically oriented threaded bores 94 and 96 are provided in cutter block 86 for securing cutter block 86 to base 50.

The bores 94 and 96 are adapted for alignment with respective vertically oriented bores 99 and 100 in base 50 for receiving a pair of bolts 102 and 104 that removably secure the cutter assembly 84 to the plate 50.

The lower interior face 98 (FIGS. 3 & 4) of the block 86 also defines a generally rectangularly shaped recess 106 (FIG. 4) aligned with the recess 69 defined in the plate 50 so as to define a centrally located through opening or card locating passageway 118 (FIG. 3) between the block 86 and the plate 50.

The cutter block 86 further includes a plurality of semicircular grooves 120 that extend in a spaced-apart and parallel relationship to one another in the recess 106 across the lower face 98 of block 86. The grooves 120 are aligned with the grooves 68 in the recess 69 so as to define a plurality of container passageways as described in more detail below.

As particularly shown in FIG. 3, the cutter block 86 additionally defines a cutter cavity 122 that terminates in a cutter mounting cavity 124.

A plurality of spaced-apart cutters, which in the embodiment of FIGS. 2–4 comprise straight blades 130, are aligned and positioned in side-by-side and parallel relationship inside the cavities 122 in a generally vertical orientation so that the base 132 of the respective blades 130 is mounted within the cavity 124, the body 134 of the respective blades 130 extends downwardly through the cavity 122, and the tip 137 thereof protrudes into the passageway 118 defined between the block 86 and the plate 50. Tips 137 terminate just short of the respective lands 71 defined on the plate 50 with which the blades 130 are aligned.

The cutter block 86 performs a dual function. Not only does the cutter block 86 serve to position the cutters themselves, it also defines the location of the entry opening 117 of passageway 118 (FIGS. 1&3) so that sufficient space is available for the body of the containers or ampoules to be received within passageway 118 before the card 332 comes in contact with the cutters 130. In this manner, responsible and reliable orientation of the card 332 can be achieved before the card 332 engages the cutters 130 during operation inasmuch as the card 332 is trapped between the cutter block 86 and the base 50 before encountering the cutters 130. Preferably the spacing between the entrance opening 117 and a cutter 130 is at least two diameters of the container or ampoule 336 in the card 332. The space between the entry opening 117 and the cutters 130 also prevents the rear end portion of the card 332 from being lifted away from the base upon contact between the card 332 and the cutter 130.

Referring to FIGS. 3 and 4, the base 132 of each of the blades 130 defines a through aperture 131 therein which allows the blades 130 to be removably secured and hung in spaced-apart and parallel relationship to one another. Elongate mounting rods 138 are adapted to extend horizontally through the respective bores 125 and through the respective side walls 126 and 128 (FIG. 4) of the block 86. A pair of nuts 148 and 150 are threaded onto the respective ends of each mounting rod 138 into abutting contact with the respective side walls 126 and 128 for removably securing the rods 138 and blades 130 to the block 86.

In use, the splitter 30 divides the card 32 or 332 into separate individual containers 36 or 336 by engaging the pusher bar 78 with card 32 or 332 and urging card 32 or 332 along the base 50 in the direction of the cutter assembly 84. The free ends of the respective pusher rods 80 are brought into abutting contact with the bottoms 44 or 344 of the respective containers or ampoules 36 or 336 respectively. The continued movement of the pusher bar 78 in the direction of the cutter assembly 84 in turn pushes the card 32 or 332 into the passageway 118 orienting the individual ampoules of the card so that the continuous frangible webs 70 are aligned with the blades 130. Further movement of the card 32 or 332 through the cutter assembly 84 then causes the tips 136 of the respective blades 130 to engage the respective frangible webs 70 defined between and separating each of the containers 36 on the card 32 or 332 to create and form a longitudinally extending cut along the respective frangible webs 70, thereby splitting the card 32 into separate, individual containers 36 or 336 after the card 32 or 332 has been fully and completely passed through the cutter assembly 84. Alternatively, the frangible webs 70 holding together the ampoules of the card can be severed only partially to faciliate complete separation manually at a later point in time.

The pusher bar 78 may be actuated by any known activating means such as, for example, pneumatics, servos, hydraulics, or by mechanical gearing. For the next operating cycle the pusher bar is retracted to its original position to allow the placement of another card 36 or 336 onto the splitter 30 and the steps described above are repeated.

The pusher assembly 72 depicted in FIGS. 2 and 3 is but one available pusher assembly embodiment. The device of the present invention encompasses other suitable pusher assembly embodiments such as, for example, the additional pusher assembly embodiments depicted in FIGS. 7 and 8.

Specifically, FIG. 7 depicts the card embodiment 32 of FIG. 2 having tab 45 extending generally normally outwardly from the bottom 44 of the respective containers 36. In accordance with this alternate embodiment of the pusher assembly, the free distal end of each of the rods 480 of the pusher assembly 476 includes a centrally located and horizontally oriented groove 439 formed therein and adapted to receive the tab 45 when the rod 480 is pushed into contact with the containers 36 for urging the card 32 through the cutter assembly. The grooved pusher rod embodiment of FIG. 7 prevents the rear end portion of the card 32 from being lifted upwardly away from the plate 450 as it is pushed into contact with the respective cutters of the cutter assembly.

FIG. 8 depicts yet a further pusher assembly embodiment 576 where the free end of each of the pusher rods 580 is provided with a shoulder 539 adapted to abut against the end of the tab 45 on the bottom 44 of the container 36 on the card 32, and with a unitary, generally horizontally extending arm 541 adapted to rest against the top face of the tab 45 for minimizing the upward movement of the rear end of the card 32 away from the surface of the plate 550 as the card 32 is pushed along the plate 550 through the cutter assembly and into contact with the respective cutters thereof.

While the splitter 30 shown in the FIGURES and described above provides for the splitting of the card 32 into six separate individual containers 36, selected ones of the blades 130 mounted within the cavity 122 may be removed from the interior of the cavity 122 for dividing the card 32 into two or more groups of two or more containers 36 which, depending upon the intended application, can then be manually separated later at the point of use. Although not shown in any of the FIGURES, it is understood that selected ones of the blades 130 are removable from the interior of the cavity 122 by first removing the entire block 86 from the plate 50, then unscrewing and sliding the rod 138 out of the block 86, followed by the removal of the selected ones of the blades 130 out of the cavity 122, which is then followed by re-inserting the rod 138 back into the block 86, and repositioning and reattaching the block 86 over the plate 50.

The blades 130 depicted in FIGS. 3 and 4 are but one of the cutter embodiments suitable for use with the device of the present invention. More particularly, any other suitable cutter embodiments including, but not limited to, the alternate cutter embodiments depicted in FIGS. 9 and 10, can be beneficially utilized as well.

FIG. 9 depicts an alternate cutter assembly 284 wherein the stationary, straight blade 130 shown in FIGS. 3 and 4 has been substituted with a circular blade 230 rotatably mounted in the interior of the cutter block 286 and extending into the passageway or nest 218 defined between the cutter block 286 and the plate 250. The blade 230 is adapted for rotation in response to contact with the card 332 as the card 332 and the containers thereof 336 are pushed through the cutter assembly 284.

FIG. 10 depicts yet another embodiment of a cutter assembly 384 wherein the straight blade 130 of FIGS. 3 and 4 has been substituted with a resistance heatable wire 330 which extends generally vertically through the cavity 322 defined in the block 388, the opening 318 defined between the block 386 and the plate 350 and then through a cavity 323 in plate 350 between the respective upper and lower faces 352 and 354 thereof. The upper and lower ends of the wire 330 are connected to a power source (schematically shown in FIG. 10) which heats the wire 330 and, in turn, melts the thermoplastic material between the containers 336 on the card 332 when the card 332 is pushed through the cutter assembly 384 thus separating the card 332 into individual containers 336.

The use of a resistance heated hot wire in lieu of a blade is particularly suited in applications where the card is made of a thermoplastic material such, as for example, low-density polyethylene (LDPE) which melts easily as opposed to a card made of a thermoplastic material such as, for example, polypropylene which is more easily cut with a blade.

It will be readily apparent from the foregoing detailed description of the invention and from the illustrations thereof that numerous variations and modifications may be effected without departing from the true spirit and scope of the novel concepts and principles of this invention.

I claim:

1. A device for splitting a card containing a plurality of thermoplastic containers and comprising:
    a base plate adapted to receive the card;
    a cutter assembly mounted to the base plate; and
    a pusher assembly movably mounted to the base plate and spaced from the cutter assembly for pushing the card past the cutter assembly and separating containers from the card wherein the cutter assembly includes a block mounted to and over the base plate and defining a passageway between the block and the base plate sized to receive the card, the cutter assembly further comprising a plurality of cutters mounted to and extending downwardly from the block into the passageway in a spaced-apart relationship from one another;
    wherein the base plate includes a plurality of spaced-apart elongate grooves adapted to receive the plurality of containers of a card in a nesting relationship therewith; and
    wherein each of the containers on the card includes a bottom, and the pusher assembly includes an elongate bar provided with a plurality of elongate spaced-apart rods mounted to and extending generally outwardly from the bar and generally parallel to the base plate, each of the rods having a free distal end adapted to abut the bottom of the respective containers for pushing the card with the respective containers nested in the grooves past the cutter assembly and through the passageway.

2. The device of claim 1 wherein the cutters comprise straight blades.

3. A device for splitting a card of thermoplastic containers into individual containers and comprising:
    a base including a plurality of spaced-apart elongate grooves formed in a top face thereof and adapted to receive the card so that containers of the card are seated in the grooves;
    a cutter assembly including a block mounted to and extending over one end portion of the base, the block including a recessed inner face that defines a passageway between the top face of the base and the block, the inner face of the block having a plurality of spaced-apart elongate grooves aligned with corresponding grooves in the base, and a plurality of cutters mounted to and extending downwardly through the block into the passageway defined between the base and the block; and
    a pusher assembly including an elongate pusher bar extending across the opposite end of the base, the pusher assembly further including a plurality of rods extending outwardly from the bar in a spaced-apart co-planar relationship to one another and aligned with the respective grooves in the base, the pusher bar being adapted to slide along the base so that free distal ends of the rods contact the bottoms of the containers for pushing the card through the cutter assembly and splitting the containers.

4. The device of claim 3 wherein the cutters comprise spaced blades mounted to the block and extending downwardly therethrough into the passageway defined between the base and the block.

5. The device of claim 4 wherein the blades are fixed straight blades.

6. An assembly for splitting a card of thermoplastic ampoules, the assembly comprising:
    a base including a top face having a plurality of spaced-apart elongate grooves and adapted to receive the card in a nesting relationship with the grooves;
    a cutter block mounted over one end of the base, the block including a recessed inner face defining a passageway between the base and the block, the inner face of the block defining a plurality of spaced-apart elongate grooves aligned with the grooves in the base;
    a plurality of spaced cutters mounted to the block and extending downwardly therefrom into the passageway defined between the block and the base; and
    a card pusher including a bar extending across the opposite end of the base and including a plurality of rods arranged in a spaced-apart, parallel relationship to one another and each positioned over a groove in the base, the bar being adapted to travel along the top face of the base so that the rods contact bottoms of the nested containers in the grooves for pushing the card into the passageway defined by the cutter block and the base, and against the cutters.

7. The assembly of claim 6 wherein each of the cutters comprises a blade mounted to the block and extending downwardly therefrom into the passageway defined between the base and the cutter block.

* * * * *